(12) United States Patent
Jabori

(10) Patent No.: US 8,269,796 B2
(45) Date of Patent: Sep. 18, 2012

(54) POINTING DEVICE WITH A DISPLAY SCREEN FOR OUTPUT OF A PORTION OF A CURRENTLY-DISPLAYED INTERFACE

(75) Inventor: Monji G. Jabori, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 257 days.

(21) Appl. No.: 12/789,295

(22) Filed: May 27, 2010

(65) Prior Publication Data

US 2011/0292085 A1    Dec. 1, 2011

(51) Int. Cl.
G09G 5/00 (2006.01)
G09G 5/08 (2006.01)
G06F 3/033 (2006.01)
G06K 9/32 (2006.01)

(52) U.S. Cl. .................. 345/667; 345/157; 382/298
(58) Field of Classification Search .................. None
See application file for complete search history.

(56) References Cited

U.S. PATENT DOCUMENTS

| | | | | |
|---|---|---|---|---|
| 6,411,275 | B1 * | 6/2002 | Hedberg | 345/156 |
| 6,563,964 | B1 * | 5/2003 | Hallberg | 382/299 |
| 7,150,402 | B2 | 12/2006 | Chang | |
| 7,536,657 | B2 * | 5/2009 | Shimizu et al. | 715/864 |
| 7,705,864 | B2 * | 4/2010 | Ahmed et al. | 345/667 |
| 8,089,495 | B2 * | 1/2012 | Keller | 345/667 |
| 2008/0048982 | A1 | 2/2008 | Choo et al. | |
| 2011/0012838 | A1 * | 1/2011 | Pance et al. | 345/173 |

FOREIGN PATENT DOCUMENTS

| | | |
|---|---|---|
| CN | 201069551 | 6/2008 |
| EP | 1170656 | 1/2002 |
| TW | 200602949 | 1/2006 |

OTHER PUBLICATIONS

English Abstract of TW200602949, 2 pages, publication date Jan. 16, 2006.
English Abstract of CN201069551, 1 page, publication date Jun. 4, 2008.
Parrish, "$500 Mouse Features LCD Screen", Tom's Hardware Guide, Apr. 16, 2009, 4 pages.
"Microsoft Hardware: SideWinder Mouse", www.microsoft.com, Feb. 26, 2010, 1 page.
Ponkko, "Project: LogiNoki", Jul. 25, 2006, 2 pages.

* cited by examiner

Primary Examiner — Kee M Tung
Assistant Examiner — Haixia Du
(74) Attorney, Agent, or Firm — Scott A. Pojunas

(57) ABSTRACT

Example embodiments relate to pointing devices, methods, and machine-readable storage media. In example embodiments disclosed herein, a pointing device may include a display screen. Example embodiments may receive an image from a computing device that includes a pointer and an area of a currently-displayed interface surrounding the pointer. Example embodiments may then output the received image on the display screen of the pointing device.

13 Claims, 4 Drawing Sheets

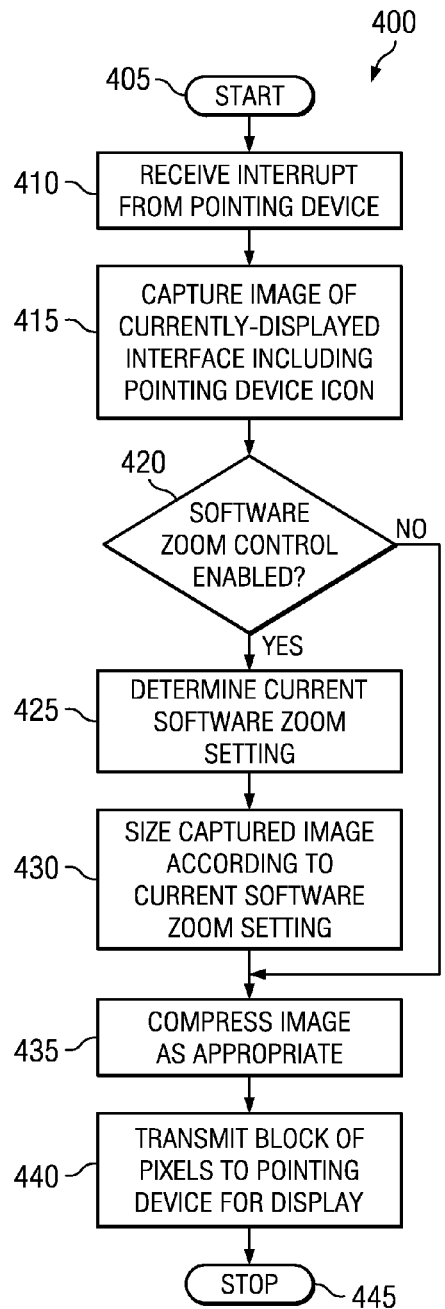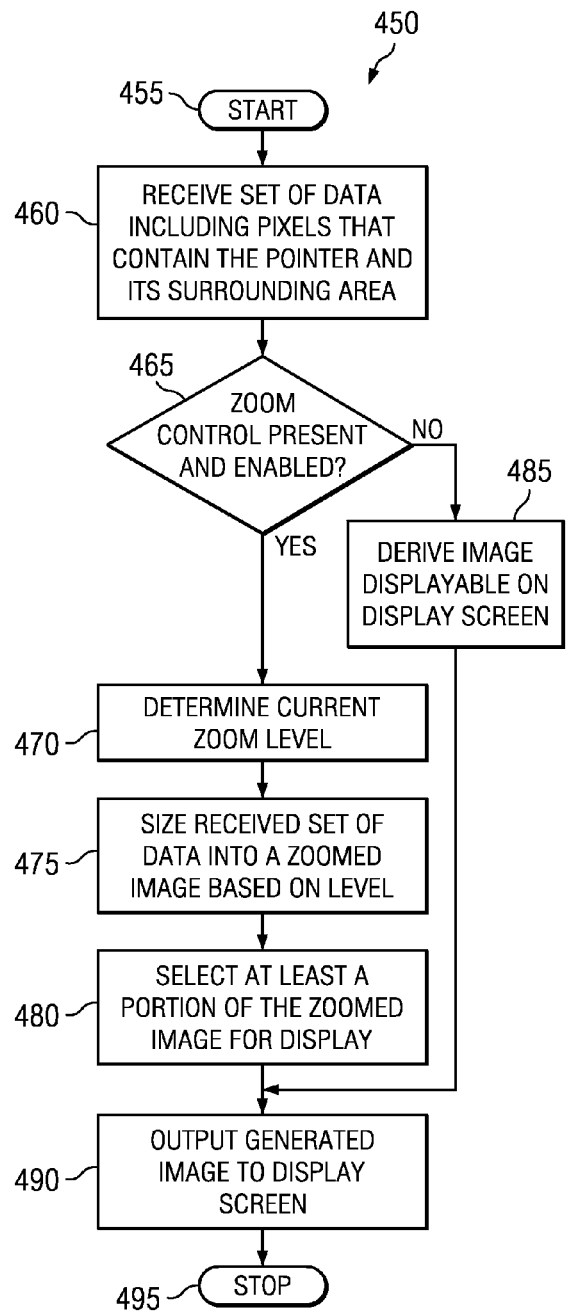
FIG. 4A
FIG. 4B

POINTING DEVICE WITH A DISPLAY SCREEN FOR OUTPUT OF A PORTION OF A CURRENTLY-DISPLAYED INTERFACE

BACKGROUND

In interacting with a personal computing device, a user typically uses a combination of a keyboard and a pointing device, such as a mouse or trackball. In this manner, the user may enter text using the keyboard, while interacting with objects outputted on a display device using a cursor controlled by the pointing device.

In some situations, a user may desire to operate the computing device at a distance. For example, when giving a presentation based on information contained on the computing device, the user may need to interact with the computer without being in close proximity to the device. Similarly, a user may desire to remotely control the device to output media files, such as video or audio. In situations like these, it is often difficult for the user to view the cursor in the user interface and, as a result, it may be difficult for the user to effectively interact with the computing device.

BRIEF DESCRIPTION OF THE DRAWINGS

In the accompanying drawings, like numerals refer to like components or blocks. The following detailed description references the drawings, wherein:

FIG. 4A is a flowchart of an example method performed by a computing device for capturing and transmitting a portion of a user interface to a pointing device including a display screen;

FIG. 4B is a flowchart of an example method performed by a pointing device for controlling output of an area of a currently-displayed interface on a display screen.

DETAILED DESCRIPTION

As described above, when a user is remotely located from a computing device, it may be difficult for the user to effectively interact with the computing device. In particular, the inability to see the cursor of the pointing device may make it difficult for the user to select the desired elements in the user interface. Accordingly, example embodiments disclosed herein relate to a pointing device with a display screen for outputting a portion of the user interface currently displayed by the computing device.

In particular, in some embodiments, a pointing device may include a display screen and a communication interface that exchanges data with the computing device. The pointing device may also include a processor and a machine-readable storage medium encoded with instructions executable by the processor. The storage medium may include instructions for receiving an image from the computing device via the communication interface. This image may include, for example, a pointer and an area of a currently-displayed interface surrounding the pointer. In addition, the storage medium may include instructions for outputting the received image to the display screen. Additional embodiments and applications of such embodiments will be apparent to those of skill in the art upon reading and understanding the following description.

In the description that follows, reference is made to the term, "machine-readable storage medium." As used herein, the term "machine-readable storage medium" refers to any electronic, magnetic, optical, or other physical storage device that contains or stores executable instructions or other data (e.g., a hard disk drive, flash memory, etc.).

Figure 1:
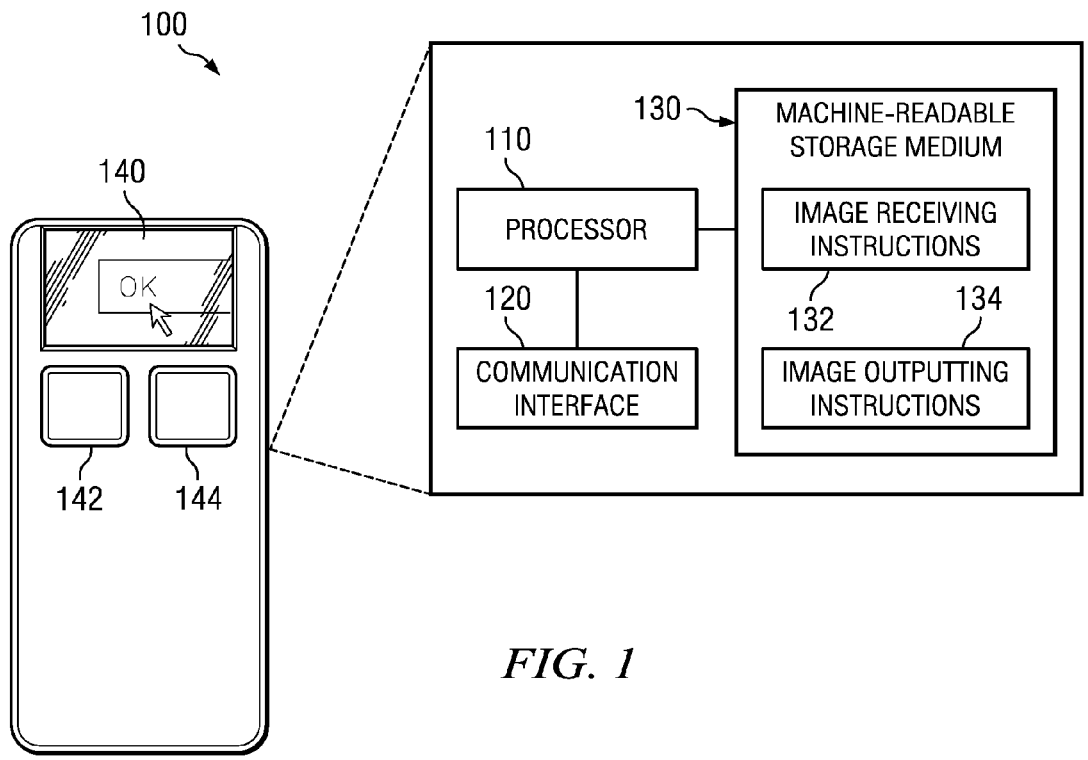
FIG. 1 is a schematic diagram of an example pointing device including a display screen for outputting an area of a currently-displayed interface.

Referring now to the drawings, FIG. 1 is a schematic diagram of an example pointing device 100 including a display screen 140 for outputting an area of a currently-displayed interface. In the embodiment of FIG. 1, pointing device 100 includes processor 110, communication interface 120, machine-readable storage medium 130, display screen 140, and buttons 142, 144.

In the illustrated embodiment, pointing device 100 is roughly in the form of a rectangular prism. In this manner, pointing device 100 may be held by the user and pointed at an associated computing device in a manner similar to a television remote control. It should be understood, however, that pointing device 100 of FIG. 1 and all other pointing devices described herein may take any form suitable to allow for control by the user. For example, the pointing devices may be wired or wireless computer mice or trackballs in any of a number of sizes and shapes. Other suitable pointing devices will be apparent.

Referring again to FIG. 1, processor 110 may comprise electrical circuitry that executes logic for managing pointing device 100. For example, processor 110 may be a semiconductor-based microprocessor, a microcontroller, or any other hardware device suitable for retrieval and execution of instructions stored in machine-readable storage medium 130. In particular, processor 110 may fetch, decode, and execute instructions 132, 134 to implement the display functionality described herein.

Communication interface 120 may be a hardware device that exchanges data with a corresponding computing device. For example, communication interface 120 may be an integrated circuit (IC) or other chip that includes radio frequency (RF) functionality for wirelessly communicating with a transceiver coupled to the computing device. As another example, communication interface 120 may be a Universal Serial Bus (USB) interface coupled to a USB host in the computing device. Regardless of the particular implementation, communication interface 120 may receive image data from the computing device that includes the pointer and an area of the currently-displayed interface surrounding the pointer. Communication interface 120 may also transmit user interaction data to the computing device, including, for example, data describing movement of pointing device 100 and activation of buttons 142, 144.

Machine-readable storage medium 130 may be an electronic, magnetic, optical, or other physical device that contains or stores executable instructions for receiving, processing, and displaying image data. As an example, machine-readable storage medium 130 may be a Read-Only Memory (ROM) chip that encodes instructions that are executable to implement the firmware of pointing device 100. Depending on the particular implementation, machine-readable storage medium 130 may be internal or external to the body of pointing device 100. Processor 110 may execute the instructions encoded on machine-readable storage medium 130 to implement the functionality described in detail below.

Machine-readable storage medium 130 may include image receiving instructions 132 that receive an image from a computing device via communication interface 120. This image may include the pointer identifying the current position of the pointing device 100 and an area of the interface surrounding the pointer. The pointer may be any icon, image, or other indication used to identify the current position of pointing device 100 in a user interface of the computing device. As described below, image outputting instructions 134 may then output this image or a processed version of the image to display screen 140.

The portion of the user interface included in the image received by image receiving instructions 132 may vary depending on the particular implementation. In some embodiments, the area of the interface included in the image is a rectangle with proportions equal to those of display screen 140. For example, if the display screen uses an aspect ratio of 4:3, the received image may be 100 pixels by 75 pixels, 133 pixels by 100 pixels, etc. In such embodiments, the image may be resized, if needed, to match the resolution of display screen 140 without changing the aspect ratio of the image.

Alternatively, the number of pixels included in the image may vary depending on a current display resolution used by the computing device in communication with pointing device 100. In such embodiments, the number of pixels included in the image may be set to be a predetermined percentage of the total display space (e.g., one percent of the interface). For example, if the computing device uses a current resolution of 1,920 pixels by 1,080 pixels, the image may use a total of 20,736 pixels (1% of 1,920 multiplied by 1,080). Thus, if the display screen uses an aspect ratio of 16:9, the image would be 192 pixels by 108 pixels; if the display screen uses an aspect ratio of 4:3, the image would be roughly 166 by 125 pixels.

In addition to being a number of different sizes, the image received by receiving instructions 132 may also be in a number of possible formats. For example, the image may be a file or stream of data encoded using a standard format, such as a bitmap (BMP) image, a Joint Photographic Experts Group (JPEG) image, or a Portable Network Graphics (PNG) image. Alternatively, the image data may use a proprietary format encoded by the pointing device driver and decoded by receiving instructions 132 or may instead be a stream of raw data to be interpreted by device 100. Other suitable methods, formats, and images for transmitting the image from the pointing device driver to communication interface 120 and image receiving instructions 132 will be apparent.

Machine-readable storage medium 130 may also include image outputting instructions 134, which may output the image received by receiving instructions 132 to display screen 140. In particular, upon receipt of the image and completion of any processing of the image, image receiving instructions 132 may trigger image outputting instructions 134 for output of the image. Image outputting instructions 134 may, in turn, refresh the display screen 140 to output the received image. In this manner, display screen 140 may be updated to contain the area of the user interface proximate to the pointer, such that the user may accurately control the pointer even when positioned at a distance from the display of the computing device.

Display screen 140 may be a screen embedded in the body of pointing device 100 for displaying an image received from image outputting instructions 134. Display screen 140 may be implemented using a Liquid Crystal Display (LCD), a Light Emitting Diode (LED) display, an electronic ink display, or any other display technology suitable for embedding in pointing device 100. Any of a number of sizes and aspect ratios may be used for screen 140 depending on the size of pointing device 100. As one example, display screen 140 could be a 1" by 1" square. As illustrated in FIG. 1, display screen 140 is currently displaying a portion of an interface including the pointer and an "OK" button.

In addition to the components used for output of the portion of the currently-displayed interface, pointing device 100 may include a number of other components for interaction with the corresponding computing device. For example, pointing device 100 may include a left click button 142 and a right click button 144, which may be depressed by the user to take an action based on the current position of the pointer. As illustrated, display screen 140 is located on a top surface of the pointing device adjacent to buttons corresponding to left click button 142 and right click button 144. Other locations of display screen 140 with respect to buttons 142, 144 will be apparent.

In addition to display screen 140 and buttons 142, 144, pointing device 100 may include a number of other components that are not illustrated in FIG. 1. For example, pointing device 100 may include components for determining and communicating movement of pointing device 100. These components may include a number of accelerometers, a light emitting diode (LED) in combination with a light sensor for optical tracking, or a ball in combination with two or more rollers for mechanical tracking of movement. In embodiments in which the computing device does not provide power, pointing device 100 may also include a power source, such as a battery. Other components included in pointing device 100 will be apparent.

Figure 2:
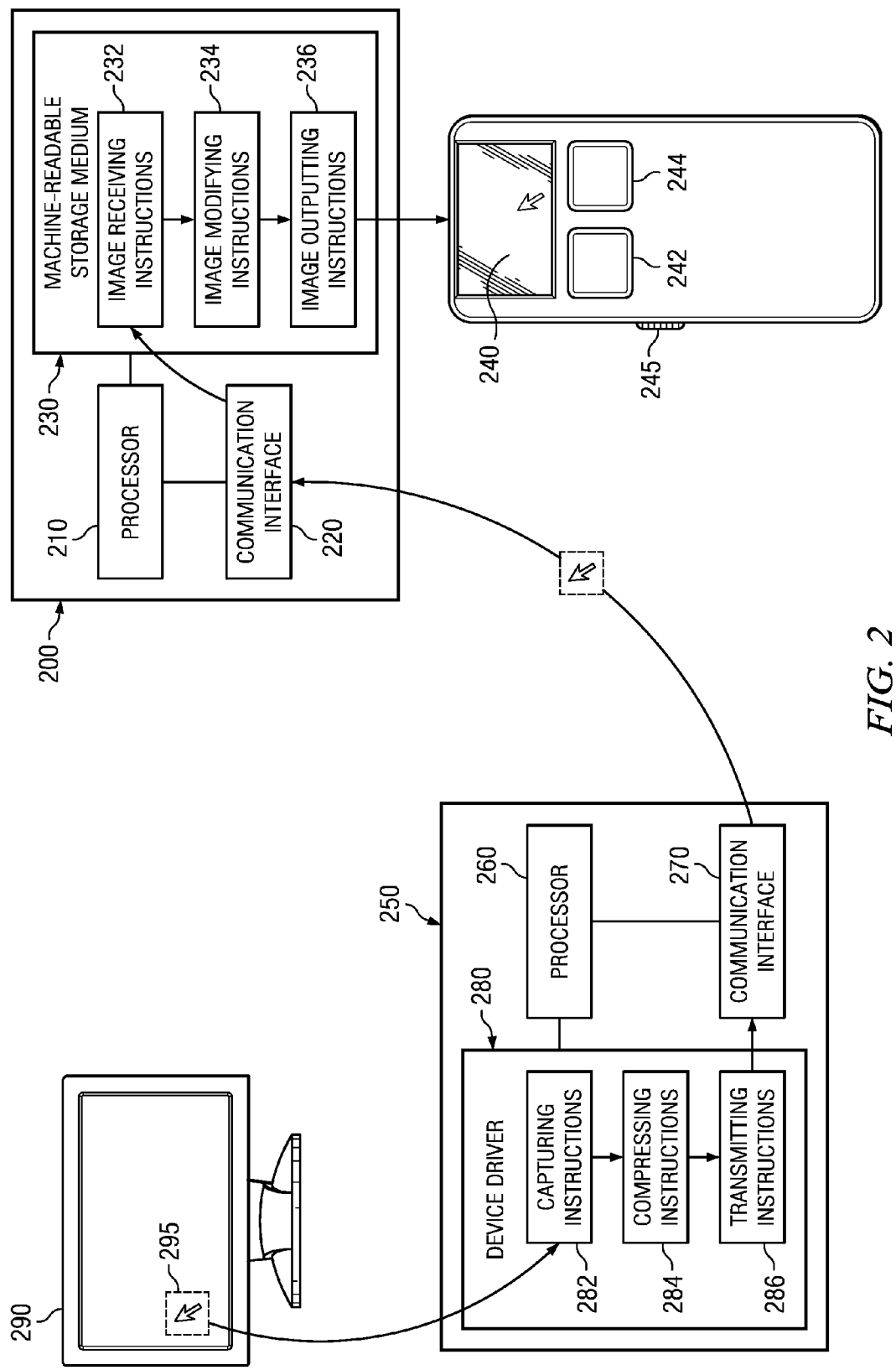
FIG. 2 is a schematic diagram of an example pointing device including a display screen in communication with an example computing device including a device driver for the pointing device.

FIG. 2 is a schematic diagram of an example pointing device 200 including a display screen 240 in communication with an example computing device 250 including a device driver 280 for the pointing device 200. As illustrated in FIG. 2 and described in further detail below, a computing device 250 may capture a portion of an interface outputted on a display device 290 and transmit this portion of the interface to a pointing device 200 for output on an embedded display screen 240.

As detailed above in connection with pointing device 100 of FIG. 1, pointing device 200 may be a device provided to allow for user interaction with computing device 250 and may be in any of a number of sizes, shapes, and configurations. As with processor 110, processor 210 may be a semiconductor-based microprocessor, a microcontroller, or any other hardware device suitable for retrieval and execution of instructions stored in machine-readable storage medium 230. As with communication interface 120, communication interface 220 may be a hardware device that exchanges data with communication interface 270 of computing device 250. Finally, as with storage medium 130 of FIG. 1, machine-readable storage medium 230 may be an electronic, magnetic, optical, or other physical device that contains or stores executable instructions for receiving, processing, and displaying image data on display screen 240. Depending on the particular implementation, machine-readable storage medium 230 may be internal or external to the body of pointing device 100.

Machine-readable storage medium 230 may include image receiving instructions 232 that receive an image from computing device 250 based on a data exchange between communication interfaces 220, 270. This image may be a set of pixels 295 including the pointer identifying the current position of pointing device 200 and an area of the interface surrounding the pointer. In some embodiments, instructions 232 may receive an updated image each time pointing device 200 triggers an interrupt event in computing device 250. Alternatively, instructions 232 may receive an updated image a predetermined number of times per second. Further details regarding the captured image and the process for obtaining this image are provided below in connection with capturing instructions 282 of display device driver 280.

Machine-readable storage medium 230 may also include image modifying instructions 234, which may process the data received from computing device 250. In particular, instructions 234 may perform a number of operations to prepare the received data for output on display screen 240.

As one example, modifying instructions 234 may crop and/or resize the image to match the resolution of display screen 240. In addition, in some embodiments, modifying instructions 234 may implement a zoom function based on a current zoom value specified by zoom control 245. The current zoom value may represent a level of magnification to be applied to the image displayed on display screen 240.

In embodiments in which a zoom functionality is implemented, image modifying instructions 234 may first determine a current zoom level desired by the user. This zoom level may correspond to a current physical position of zoom control 245 or may be a value stored in pointing device 200 representing the zoom level desired by the user. As an example, the zoom levels could be a discrete number of predetermined values, such as 0.5×, 1×, 2×, and 4×. Alternatively, the zoom levels may be an analog range of values based on the current position of zoom control 245 and, in such embodiments, may take any value between a minimum and maximum zoom level.

After determining the desired zoom level, modifying instructions 234 may size the image received from computing device 250 in accordance with the zoom level. When implementing a zoom level higher than 1× (e.g., 2× zoom), instructions 234 may first increase the size of the received image (e.g., double the size) using an image resizing procedure, such as a nearest neighbor, bilinear, or bicubic method. Instructions 234 may then select the predetermined image size from the resized image. In this manner, by increasing the image size but selecting a block of the same number of pixels, the pointer and the surrounding area appear to be larger.

Conversely, when implementing a zoom level lower than 1 (e.g., 0.5× zoom), instructions 234 may first decrease the size of the image received from computing device 250 according to the zoom level. Instructions 234 may then select a block corresponding to the predetermined image size from the resized image. In this manner, by decreasing the image size but selecting a block of the same number of pixels, a larger portion of the received image is displayed, thereby simulating a zoom out effect.

To give a specific example, suppose the image transferred by computing device 250 is 200 pixels by 200 pixels, with the pointer centered at the position (100, 100). Further suppose that display screen 240 is 100 pixels by 100 pixels, with a 1× zoom corresponding to the 100×100 block in the center of the received image. To implement a 2× zoom, modifying instructions 234 would first double the size of the received image to 400 pixels by 400 pixels and then select the 100×100 block centered at the position (200, 200) for output on display screen 240. Alternatively, to implement a 0.5× zoom, modifying instructions would resize the received image to 100 pixels by 100 pixels and select the entire image as the portion to be outputted on display screen 240.

Although a particular procedure for performing the zoom function is detailed above, other suitable procedures for deriving a zoomed image will be apparent. Furthermore, it should be noted that, in some embodiments, the processing described above in connection with modifying instructions 234 may instead be performed in computing device 250 prior to transmission of the set of pixels to pointing device 200. For example, in some embodiments, pointing device 200 may communicate the current value of zoom control 245 to computing device 250. In response, computing device 250 may modify the image to reflect the current zoom setting prior to transmission to pointing device 200.

Machine-readable storage medium 130 may also include image outputting instructions 236, which may output the image derived by modifying instructions 234. In particular, after processing the received image, image modifying instructions 234 may trigger image outputting instructions 236 for output of the image. Image outputting instructions 236 may, in turn, refresh the display screen 240 to output the received image.

As with display screen 140 of FIG. 1, display screen 240 may be a screen embedded in the body of pointing device 200 and may be implemented using any of a number of display technologies (e.g., LCD, LED, electronic ink, etc.). Left click button 242 and right click button 244 may allow a user to take action based on the current position of the pointer in the user interface.

In addition, in the embodiment of FIG. 2, pointing device 200 includes a zoom control 245. In some embodiments, zoom control 245 may be a hardware device attached to the body of pointing device 200, such as a dial, a slider, or one or more buttons. Other suitable hardware devices for control of the zoom level will be apparent. As described above in connection with image modifying instructions 234, the current zoom level specified by the user using zoom control 245 may be utilized to control the level of zoom of the image outputted on display screen 240.

Computing device 250 may be, for example, a desktop computer, a laptop computer, a tablet computer, a server, a handheld computing device, or the like. Computing device 250 may include a processor 260, a communication interface 270, a device driver 280, and a coupled display device 290.

Processor 260 may be a central processing unit (CPU), a semiconductor-based microprocessor, or any other hardware device suitable for retrieval and execution of device driver instructions 280. In particular, processor 260 may fetch, decode, and execute instructions 282, 284, 286 to implement the image capture, compression, and transmission functionality described in detail below.

Communication interface 270 may be a hardware device that exchanges data with a corresponding communication interface 220 of pointing device 200. For example, communication interface 270 may be a radio frequency (RF) device for wirelessly communicating with a transceiver included in pointing device 200. As another example, communication interface 270 may be a USB host in communication with a USB interface in pointing device 200. Regardless of the particular implementation, communication interface 270 may transmit image data that includes the pointer and an area of the currently-displayed interface surrounding the pointer. Communication interface 270 may also receive user interaction data from pointing device 200, including, for example, data describing movement of pointing device 200, activation of buttons 242, 244, and a zoom level specified by zoom control 245.

Display device driver 280 may include a series of instructions encoded on a machine-readable storage medium, which may be an electronic, magnetic, optical, or other physical device that contains or stores executable instructions. In particular, display device driver 280 may include instructions 282 for capturing an image from a currently-displayed interface, instructions 284 for compressing the image, and instructions 286 for transmitting the image to pointing device 200 via communication interface 270.

More specifically, capturing instructions 282 may capture an image of an interface currently outputted on display device 290. This image may be a set of pixels 295 including an indication representing a current position of pointing device 200 in the interface. The indication may be, for example, a cursor, an icon, or any other graphical cue indicating the location of the pointer within the interface. In some embodiments, capturing instructions 282 may capture an image from the interface upon the occurrence of an interrupt event. As an alternative, capturing instructions 282 may obtain an image a predetermined number of times per second (e.g., 30 times per second).

In obtaining the image to be transmitted to pointing device 200, capturing instructions 282 may first determine a current position of the pointer by, for example, retrieving X and Y coordinates maintained by device driver 280. Capturing instructions 282 may then determine a size of the image to be captured from the currently-displayed interface. This size may be a fixed number of pixels based on, for example, a resolution of display screen 240 of pointing device 200 and/or an aspect ratio of display screen 240. In such embodiments, the fixed number of pixels may have dimensions that are a multiple of the resolution of display screen 240 (e.g., 1×, 2×, 4×, etc.). Alternatively, the size may be determined based on a current display resolution used for the interface (e.g., 1 percent of the entire interface). As another example, when sufficient bandwidth exists between communication interfaces 220, 270, capturing instructions 282 may capture the entire user interface. Other suitable methods for determining the size of the image to be captured will be apparent.

After determining the position of the pointer and the size of the image to be captured, capturing instructions 282 may then capture an image of the determined size that includes the current pointer position. As one example, capturing instructions 282 may utilize an Application Programming Interface (API) function provided by the operating system to capture an image of the screen. In such embodiments, capturing instructions 282 may utilize the screen capture function to obtain an image of the entire screen and subsequently crop the image to obtain the desired set of pixels 295. Alternatively, capturing instructions 282 may directly obtain the desired set of pixels 295 by, for example, accessing a video buffer of a display device included in computing device 250.

In some embodiments, capturing instructions 282 may implement an image zoom based on a software zoom setting specified by a user. For example, display device driver 280 may provide a user interface that allows the user to manually control a level of zoom applied to the image outputted on display screen 240. Alternatively, display device driver 280 may obtain the zoom level of a hardware zoom control 245 from pointing device 200 via communication interface 220. In embodiments in which a zoom level is applied to the image prior to transmission, capturing instructions 282 may first identify the current zoom level and then resize the image in accordance with the zoom level. In resizing the image, capturing instructions 282 may execute a zoom procedure, as described above in connection with modifying instructions 234.

Compressing instructions 284 may further process the image captured by capturing instructions 282 and, more specifically, may compress the image. Compressing instructions 284 may receive the captured image from instructions 282 and, in response, may process the image to reduce the number of bytes required to transmit the image to pointing device 200. For example, compressing instructions 284 may execute a procedure to convert the captured image data to a compressed image format, such as a JPEG, PNG, or other compressed image file.

In some embodiments, compressing instructions 284 may execute a simplified compression procedure to quickly reduce the size of the image to be transmitted. For example, compressing instructions 284 may process the image in a plurality of subsets (e.g., blocks of a fixed number of pixels) and, for each subset, calculate a value representative of all pixels in the subset. This value may be, for example, an average of the colors included in each of the pixels in the subset. The averaged value may then take the place of all pixels in the subset in the image transmitted to pointing device 200 and outputted on display screen 240. Other suitable methods for compressing the image prior to transmission to pointing device 200 will be apparent.

Transmitting instructions 286 may obtain the captured image from compressing instructions 284 or from capturing instructions 282 (if no compression is performed). Upon receipt of the set of pixels, transmitting instructions 286 may utilize communication interface 270 for transmission of the set of pixels to communication interface 220 of pointing device 200. Pointing device 200 may then output the received set of pixels to display screen 240 based on execution of the instructions 232, 234, 236 described in detail above.

Display device 290 may be a display screen, such as a cathode ray tube (CRT) monitor, a liquid crystal display (LCD) screen, or a screen implemented using another display technology. Display device 290 may be internal or external to computing device 250 depending on the configuration of computing device 250. By outputting a user interface, display screen 290 may allow for user interaction with computing device 250. As described in detail above, the image captured, compressed, and transmitted by device driver 280 may be a portion of the interface 295 currently displayed on display device 290.

Figure 3A:
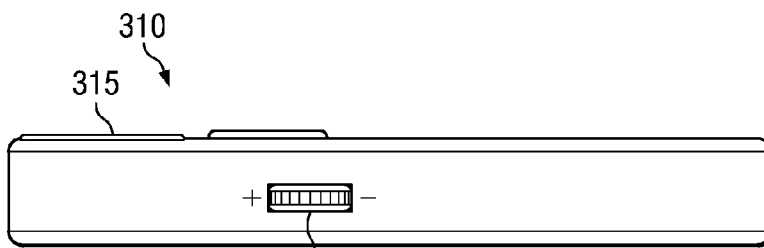
FIG. 3A is a side view of an example pointing device including a dial for controlling a level of magnification applied to a display screen of the pointing device.

FIG. 3A is a side view of an example pointing device 310 including a dial 320 for controlling a level of magnification applied to a display screen 315 of the pointing device. Dial 320 may be, for example, a rotatable wheel constructed of plastic, metal, or another suitable material. Although illustrated on a surface on the left side of pointing device 310, dial 320 may be placed on any surface of pointing device 310.

By rotating dial 320 in a clockwise direction toward the "+" symbol on the casing, a user may increase the zoom level applied to the image displayed on display screen 315. Conversely, by rotating dial 320 in a counter-clockwise direction toward the "−" symbol on the casing, the user may decrease the zoom level applied to the image displayed on display screen 315. Dial 320 may be rotatable in a limited number of rotations in each direction, such that a minimum and maximum zoom value may be defined. Suitable methods for resizing the image based on the current zoom level of dial 320 are described in detail above in connection with FIG. 2.

Figure 3B:
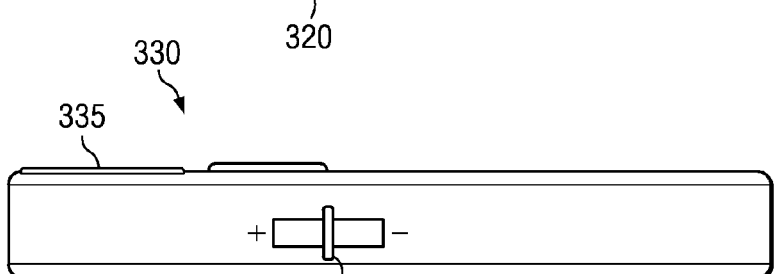
FIG. 3B is a side view of an example pointing device including a slider for controlling a level of magnification applied to a display screen of the pointing device.

FIG. 3B is a side view of an example pointing device 330 including a slider 340 for controlling a level of magnification applied to a display screen 335 of the pointing device. Slider 340 may be, for example, a bar constructed of plastic, metal, or other suitable material that is engaged in a groove that extends laterally along the side surface of pointing device 330. Although illustrated as moving laterally on a surface of the left side of pointing device 330, slider 340 may be placed on any surface of pointing device 310 and may extend in any direction.

By moving slider 340 in a lateral direction toward the "+" symbol on the casing, a user may increase the zoom level applied to the image displayed on display screen 335. Conversely, by moving slider 340 in the opposite direction toward the "−" symbol on the casing, the user may decrease the zoom level applied to the image displayed on display screen 335. The leftmost and rightmost positions of slider 340 may correspond to a maximum and minimum zoom level, respectively. Suitable methods for resizing the image based on the current zoom level of slider 340 are described in detail above in connection with FIG. 2.

Figure 3C:
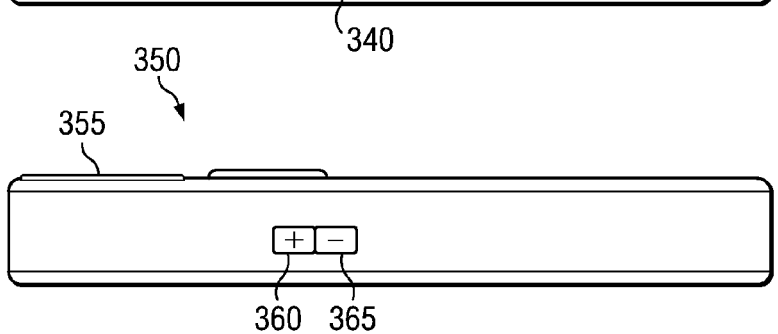
FIG. 3C is a side view of an example pointing device including buttons for controlling a level of magnification applied to a display screen of the pointing device.

FIG. 3C is a side view of an example pointing device 350 including buttons 360, 365 for controlling a level of magnification applied to a display screen 355 of the pointing device. Buttons 360, 365 may be, for example, small portions of plastic, metal, or another suitable material that may be depressed toward the body of pointing device 350 to register input from a user. Although illustrated on the left side of pointing device 350, buttons 360, 365 may be placed on any surface of pointing device 350.

By depressing plus button 360, a user may increase the zoom level applied to the image displayed on display screen 355. Conversely, by depressing minus button 365, the user may decrease the zoom level applied to the image displayed on display screen 355. In this manner, each time the user depresses one of the buttons 360, 365, pointing device 350 may increment or decrement the current zoom level stored in memory of pointing device 350. In some embodiments, pointing device 350 may define maximum and minimum zoom levels, such that the user may only zoom in or out to a limited level. Suitable methods for resizing the image based on the current zoom level specified by buttons 360, 365 are described in detail above in connection with FIG. 2.

Although illustrated as including a different button for zooming in and zooming out, in some embodiments, pointing device 350 may include a single zoom button. In such embodiments, the user may depress the zoom button to continuously cycle through a number of available zoom options. In this manner, each time the user depresses the button, pointing device 350 may apply the next selectable zoom level.

FIG. 4A is a flowchart of an example method 400 performed by a computing device 250 for capturing and transmitting a portion of a user interface to a pointing device 200 including a display screen 240. Although execution of method 400 is described below with reference to computing device 250, other suitable components for execution of method 400 will be apparent. Method 400 may be implemented in the form of executable instructions stored on a machine-readable storage medium.

Method 400 may start in block 405 and proceed to block 410, where computing device 250 may receive an interrupt generated by pointing device 200. In particular, pointing device 200 may be configured to generate an interrupt event in the operating system when the user moves pointing device 200, selects a button, changes a zoom level, or otherwise interacts with pointing device 200. Accordingly, computing device 250 may determine that it should capture an updated image for display on pointing device 200. It should be noted that, in some embodiments, this process may instead be triggered on a regular basis by a pointing device driver (e.g., 30 times per second).

After detection of an interrupt or another determination that a new image should be captured, method 400 may proceed to block 415. In block 415, computing device 250 may capture an image of a currently-displayed user interface. This image may include a pointing device indication and an area of the interface surrounding the indication. In determining the size of the captured image, computing device 250 may consider the resolution and aspect ratio of the display screen 240 of pointing device 200 and/or a resolution of the currently-displayed interface. Further details for selecting the image size and capturing the image from the currently-displayed interface are provided in detail above in connection with capturing instructions 282 of device driver 280.

After capturing the image from the interface, method 400 may proceed to block 420, where computing device 250 may determine whether a software zoom control is enabled. Computing device 250 may make this determination based, for example, on a display device driver setting. If software zoom is disabled or not implemented, method 400 may skip to block 435, described in further detail below. Alternatively, if a software zoom control is enabled, method 400 may proceed to block 425.

In block 425, computing device 250 may determine the current zoom setting selected by the user by, for example, retrieving the current value stored by the display device driver. This zoom setting may be, for example, a value indicating a percentage (e.g., 50%, 100%, 200%), a level of magnification (0.5×, 1×, 2×), or another similar value.

After determining the current zoom level, method 400 may proceed to block 430, where computing device 250 may size the captured image according to the current zoom setting. In particular, when implementing a zoom level higher than 1×, computing device 250 may first increase the size of the captured image using an image resizing procedure and may then select the predetermined image size from the resized image. Conversely, when implementing a zoom level lower than 1×, computing device 250 may first decrease the size of the image received from computing device 250 according to the zoom level. Instructions 234 may then select a block corresponding to the predetermined image size from the resized image. Further details of this particular procedure for creating a zoomed image are provided above in connection with modifying instructions 234 of FIG. 2. Other suitable procedures for generating a zoomed image will be apparent.

Method 400 may then proceed to block 435, where computing device 250 may compress the image to be transmitted to pointing device 200. In particular, computing device 250 may execute a procedure to convert the captured image to a compressed image format (e.g., JPEG, PNG, etc.) or may instead execute a simplified compression procedure. Further examples of techniques for compressing the image are provided above in connection with compressing instructions 284 of FIG. 2.

Finally, after applying any zoom and compressing the image as necessary, method 400 may proceed to block 440, where computing device 250 may transmit the image to pointing device 200 for display on display screen 240. In particular, communication interface 270 of computing device 250 may transmit the image to communication interface 220 of pointing device 200. Method 400 may then proceed to block 445, where method 400 may stop.

FIG. 4B is a flowchart of an example method 450 performed by a pointing device 200 for controlling output of an area of a currently-displayed interface on a display screen 240. Although execution of method 450 is described below with reference to pointing device 200, other suitable components for execution of method 450 will be apparent. Method 450 may be implemented in the form of executable instructions stored on a machine-readable storage medium.

Method 450 may start in block 455 and proceed to block 460, where pointing device 200 may receive a set of data comprising a portion of a user interface currently displayed on a computing device in communication with pointing device 200. This set of data may correspond to, for example, a number of pixels included in the user interface and may include a pointing device indication (e.g., an icon, cursor, etc.) and an area surrounding the pointing device indication.

After receipt of the set of data, method 450 may proceed to block 465, where pointing device 200 may determine whether a hardware zoom control is present and enabled. If a zoom control is both present and enabled, method 450 may proceed to block 470, where pointing device 200 may determine the current zoom level specified by the user with the zoom control. The zoom level may represent a magnification percentage (e.g., 50%, 100%, 200%) or a corresponding zoom multiplier (e.g., 0.5×, 1×, 2×).

After determining the current zoom level, method 450 may proceed to block 475, where pointing device 200 may process the received image and size the received set of data into a zoomed image based on the current zoom level. For example, when the current zoom level is higher than 1×, pointing device 200 may increase the size of the received image by the corresponding percentage (e.g., double the size when the zoom level is 200% or 2×). Alternatively, when the current zoom level is lower than 1×, pointing device 200 may decrease the size of the received image by the corresponding percentage (e.g., halve the size when the zoom level is 50% or 0.5×).

Method 450 may then proceed to block 480, where pointing device 200 may select at least a portion of the zoomed image for display. For example, pointing device 200 may select a rectangle of a predetermined size that is centered in the middle of the resized image. The size of the selected rectangle may correspond, for example, to a resolution of display screen 240. By selecting an image of a fixed size from the resized image, pointing device 200 may simulate the effect of zooming in or out on the image to be displayed on display screen 240.

Additional details and implementations for performing an example zoom procedure are provided in detail above in connection with image modifying instructions 234 of FIG. 2. Furthermore, it should be noted that, in some embodiments, the set of data received in block 460 is a pre-zoomed image. In particular, as described in detail above in connection with FIG. 4A, the computing device may instead perform any zoom processing prior to transmission of the set of data to pointing device 200.

Referring again to block 465, when it is determined that a zoom control is not present or is disabled, method 450 may proceed to block 485, where pointing device 200 may derive an image displayable on the screen without performing zoom processing. In particular, pointing device 200 may crop and/or resize the received image to generate an image that may be outputted to display screen 240.

After generation of a zoomed image in block 480 or a non-zoomed image in block 485, method 450 may proceed to block 490. In block 490, pointing device 200 may trigger a refresh of display screen 240 using the generated image. Method 450 may then proceed to block 495, where method 450 may stop.

Figure 5:
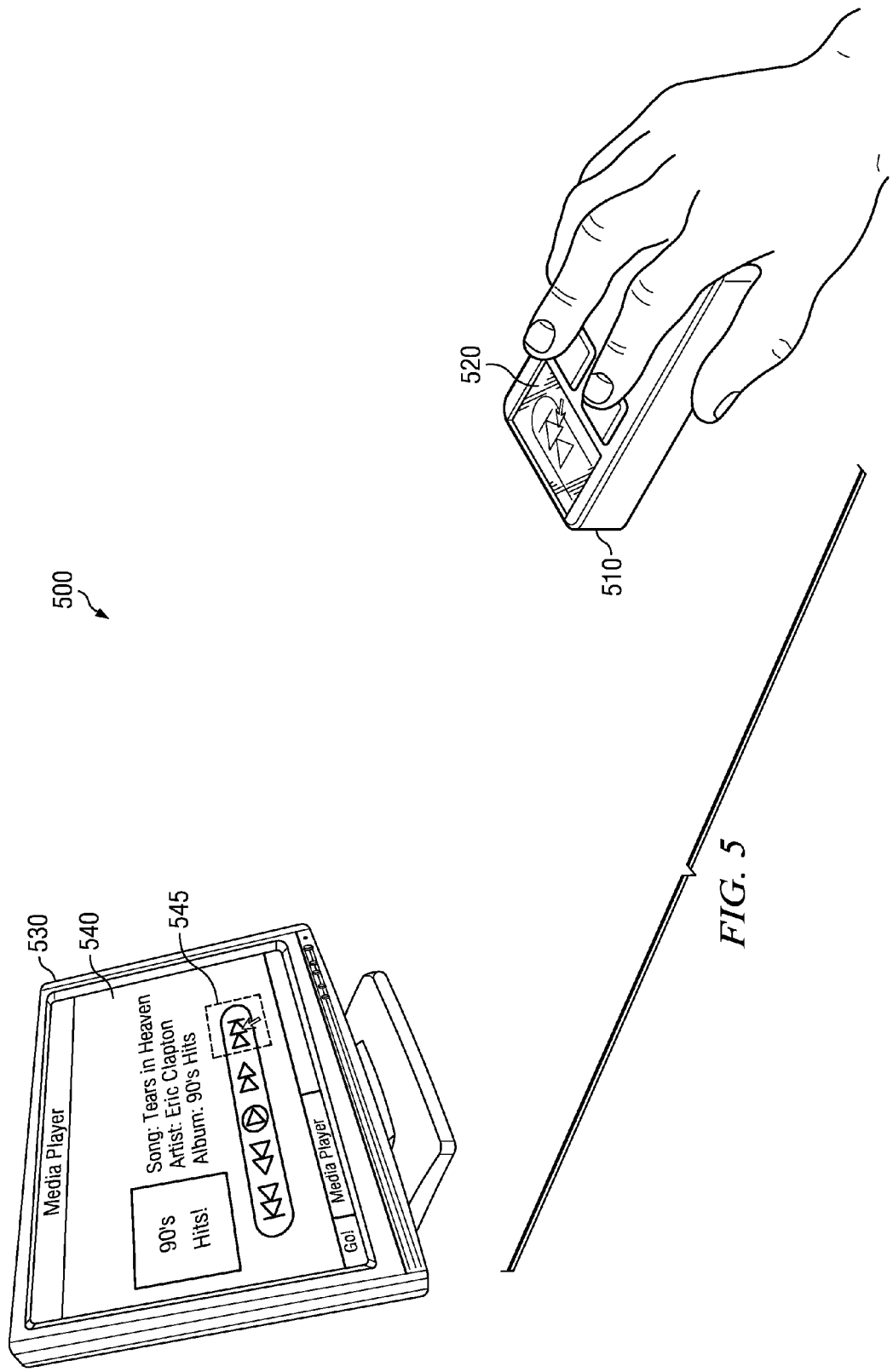
FIG. 5 is a schematic diagram of an example interaction between a pointing device and a personal computing device.

FIG. 5 is a schematic diagram of an example interaction 500 between a pointing device 510 and a computing device 530. As illustrated, a user is currently controlling pointing device 510 in a manner similar to a conventional mouse. As also illustrated, personal computing device 530 is currently displaying a user interface 540 of a media player application.

According to the embodiments described in detail above, display screen 520 of pointing device 510 is currently displaying a portion 545 of interface 540 including the pointer and an area surrounding the pointer. In particular, computing device 530 has transmitted the portion 545 to pointing device 510 and, in response to receipt of the portion 545, pointing device has outputted it on display screen 520. In this manner, by looking at screen 520, the user may determine that the pointer is currently positioned over a "Next Track" control without the need to move closer to computing device 530.

According to the foregoing, various embodiments relate to a pointing device with an embedded display screen for output of a portion of a currently-displayed interface. In particular, the pointing device may utilize the display screen to output the pointer and an area of the interface surrounding the pointer. By using the pointing device with the embedded screen, the user may interact with the interface of the computing device in an effective manner, even when positioned at a distance from the computing device.

I claim:

1. A pointing device comprising:
   a communication interface to exchange data with a computing device;
   a processor;
   a display screen; and
   a machine-readable storage medium encoded with instructions executable by the processor, the machine-readable storage medium comprising:
      instructions for receiving an image from the computing device via the communication interface, the image including a pointer and an area of a currently-displayed interface surrounding the pointer, wherein the image is a rectangle with proportions equal to proportions of the display screen and dimensions determined based on a predetermined percentage of a current resolution of the currently-displayed interface, and
      instructions for outputting the received image on the display screen.

2. The pointing device of claim 1, further comprising:
   a zoom control;
   wherein the machine-readable storage medium further comprises:
      instructions for modifying the image based on a current zoom value specified by the zoom control, wherein the current zoom value indicates a level of magnification to be applied to the pointer and the area surrounding the pointer.

3. The pointing device of claim 2, wherein the zoom control is selected from the group consisting of a dial, a slider, and at least one button.

4. The pointer device of claim 1, wherein:
   the instructions for receiving the image from the computing device receive an updated image each time a pointing device interrupt is generated, and
   the instructions for outputting update the display screen upon receipt of each updated image.

5. The pointer device of claim 1, wherein the communication interface wirelessly receives data from a corresponding wireless communication interface of the computing device.

6. A method comprising:
   receiving, in a pointing device including a display screen, a set of data comprising a portion of a user interface currently displayed by a computing device, the portion of the user interface including a pointing device indication and a surrounding area, wherein the portion of the user interface is a rectangle with proportions equal to proportions of the display screen and dimensions determined based on a predetermined percentage of a current resolution of the user interface;

deriving an image displayable on the display screen of the pointing device using the set of data comprising the portion of the user interface; and outputting the image on the display screen of the pointing device, the image including the pointing device indication and at least a portion of the surrounding area.

7. The method of claim 6, wherein deriving the image displayable on the display screen comprises:

determining a current zoom value specified by a zoom control of the pointing device;

sizing the portion of the user interface into a zoomed image in accordance with the current zoom value; and selecting at least a portion of the zoomed image as the image displayable on the display screen of the pointing device.

8. The method of claim 6, wherein:

the set of data includes a zoomed image captured from the user interface in accordance with a zoom setting, and the zoom setting is either a software zoom setting provided by a user to a driver of the pointing device or a hardware zoom setting specified using a zoom control of the pointing device.

9. The method of claim 6, wherein the receiving, deriving, and outputting occur each time a pointing device interrupt is generated in the computing device.

10. A non-transitory machine-readable storage medium encoded with instructions executable by a processor of a computing device, the machine-readable storage medium comprising:

instructions for capturing an image of a currently-displayed user interface, wherein the image is a set of pixels including an indication representing a current position of a pointing device and wherein the image is a rectangle with proportions equal to proportions of a display screen of the pointing device and dimensions determined based on a predetermined percentage of a current resolution of the currently-displayed user interface; and instructions for transmitting the set of pixels of the currently-displayed user interface to the pointing device for display on the display screen of the pointing device.

11. The non-transitory machine-readable storage medium of claim 10, further comprising:

instructions for compressing the image prior to transmission to the pointing device.

12. The non-transitory machine-readable storage medium of claim 11, wherein the instructions for compressing the image process the image in a plurality of subsets, wherein data for each subset in the image is an average of all pixels in the subset.

13. The non-transitory machine-readable storage medium of claim 10, wherein the instructions for capturing the image further comprise:

instructions for determining a current zoom level specified by a user of the computing device; and instructions for capturing the image of the currently-displayed user interface based on the current zoom level.

\* \* \* \* \*